(12) United States Patent
Sato et al.

(10) Patent No.: US 9,471,979 B2
(45) Date of Patent: Oct. 18, 2016

(54) IMAGE RECOGNIZING APPARATUS AND METHOD

(71) Applicant: CANON KABUSHIKI KAISHA, Tokyo (JP)

(72) Inventors: Hiroshi Sato, Kawasaki (JP); Takashi Suzuki, Tokyo (JP); Shunsuke Nakano, Kawasaki (JP); Atsuo Nomoto, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/664,085

(22) Filed: Mar. 20, 2015

(65) Prior Publication Data

US 2015/0278580 A1    Oct. 1, 2015

(30) Foreign Application Priority Data

Mar. 25, 2014 (JP) ................. 2014-062663

(51) Int. Cl.
    *G06K 9/00*      (2006.01)
    *G06T 7/00*      (2006.01)
    *G06K 9/62*      (2006.01)

(52) U.S. Cl.
CPC ......... *G06T 7/0024* (2013.01); *G06K 9/00268* (2013.01); *G06K 9/00288* (2013.01); *G06K 9/6234* (2013.01); *G06K 9/6247* (2013.01); *G06K 9/6255* (2013.01)

(58) Field of Classification Search
CPC ..................... G06K 9/00288; G06K 9/00248; G06K 9/00281; G06K 9/00221; G06K 9/00228; G06K 9/00268; G06T 7/0024
See application file for complete search history.

(56) References Cited

U.S. PATENT DOCUMENTS 5,760,346 A    6/1998    Kobayashi et al.
5,761,087 A    6/1998    Yoshimura et al.
(Continued)

FOREIGN PATENT DOCUMENTS

JP      2011-086265 A    4/2011

OTHER PUBLICATIONS

J. Wright et al., "Implicit elastic matching with random projections for pose-variant face recognition", In Proc, CVPR, 2009.
(Continued)

*Primary Examiner* — Kim Vu
*Assistant Examiner* — Michael Vanchy, Jr.
(74) *Attorney, Agent, or Firm* — Fitzpatrick, Cella, Harper & Scinto

(57) ABSTRACT

An image recognizing apparatus comprises: an extracting unit extracting a partial feature quantity from an object in each of a registration image and an input image; a compressing unit reducing a dimension of the extracted partial feature quantity; a storing unit storing the partial feature quantity of the object in the registration image of which the dimension has been reduced; and a calculating unit calculating similarity between the object in the input image and the object in the registration image, using the partial feature quantity of the object in the input image of which the dimension has been reduced and the partial feature quantity of the object in the stored registration image. The compressing unit switches the reduction of the dimension of the partial feature quantity using a preset dimension compression parameter and the reduction of the dimension of the partial feature quantity by dynamically generating a dimension compression parameter.

8 Claims, 12 Drawing Sheets

(56) References Cited

U.S. PATENT DOCUMENTS

| | | | |
|---|---|---|---|
| 5,862,049 | A | 1/1999 | Sato et al. |
| 6,225,986 | B1 | 5/2001 | Sato et al. |
| 6,239,792 | B1 | 5/2001 | Yanagisawa et al. |
| 6,288,711 | B1 | 9/2001 | Tanaka et al. |
| 6,611,258 | B1 | 8/2003 | Tanaka et al. |
| 7,881,524 | B2 | 2/2011 | Matsugu et al. |
| 7,912,253 | B2 | 3/2011 | Suzuki et al. |
| 8,331,655 | B2 | 12/2012 | Sato et al. |
| 8,515,136 | B2 | 8/2013 | Mori et al. |
| 8,527,439 | B2 | 9/2013 | Torii et al. |
| 8,626,782 | B2 | 1/2014 | Sato |
| 8,781,235 | B2 | 7/2014 | Suzuki et al. |
| 8,929,595 | B2 | 1/2015 | Suzuki et al. |
| 8,942,436 | B2 | 1/2015 | Mori et al. |
| 2010/0166266 | A1* | 7/2010 | Jones ............... G06K 9/00288 382/118 |
| 2011/0091113 | A1* | 4/2011 | Ito ..................... G06K 9/00248 382/197 |
| 2011/0158540 | A1 | 6/2011 | Suzuki et al. |
| 2012/0014609 | A1* | 1/2012 | Iwamoto ................. G06K 9/38 382/195 |
| 2013/0142401 | A1 | 6/2013 | Nomoto et al. |
| 2014/0056509 | A1 | 2/2014 | Nakashima et al. |
| 2015/0146991 | A1 | 5/2015 | Nakano et al. |

OTHER PUBLICATIONS

P. Viola et al., "Robust real-time face detection", pp. 747, Eighth International Conference on Computer Vision (ICCV'01), vol. 2, 2001.

U.S. Appl. No. 14/666,139, filed Mar. 23, 2015. Applicants: Shunsuke Nakano, et al.

U.S. Appl. No. 14/664,085, filed Mar. 20, 2015. Applicants: Hiroshi Sato, et al.

\* cited by examiner

IMAGE RECOGNIZING APPARATUS AND METHOD

BACKGROUND OF THE INVENTION

1. Field of the Invention

The present invention relates to image recognizing apparatus and method which are suitably used to discriminate an object by extracting a feature quantity.

2. Description of the Related Art

Conventionally, a technique of discriminating whether or not a subject in an image is identical with a subject in another image has been known. Particularly, a face discriminating technique of discriminating the face of an individual has been known. In the technique like this, as a factor of deteriorating discrimination performance, there is a variation which occurs between a registration pattern and an authentication pattern. More specifically, variations which occur due to illumination condition, direction/pose, hiding by another object, expression and the like become the factor of deteriorating discrimination performance.

To prevent such deterioration of the discrimination performance, there is a method of paying attention to a partial portion of an object in the image. For example, when the object is a person's face, influence of such variations as above does not appear uniformly in the whole area of the face. Namely, in the case where the variation occurs due to the expression, if it is assumed that the image of a face showing expression and the image of a face showing no expression are compared, then it is thought, between these images, that the variation near the nose is smaller than that of the mouth or the eyes. Moreover, in the case where the variation occurs due to the illumination, if strong illumination light is obliquely struck, it is though that the magnitude of the variation in the portion where the light is struck is difference from the magnitude of the variation in the portion where the oblique light is not struck. Moreover, if it is assumed that, in the image, the face direction is pointed to the left relatively from the observer's side, since the left side of the face is the rear side and thus hidden because of the three-dimensional shape of the face, it is thought that the variation between the front face and the right-side face is larger than that between the front face and the left-side face.

As just described, if the variations of the expression, the illumination, the face direction and the like occur, there is a possibility that, even if the variation in a local area is extremely high, the variation in another local area appears to the extent that an individual can be identified. Consequently, if similarities of the respective local areas in which the variations are comparatively small are selectively integrated and used, it becomes possible to discriminate the individual with a high degree of accuracy.

Incidentally, to cope with a large variation, it is thought that registration patterns respectively corresponding to a plurality of variation patterns are previously registered. For example, in the case of person's face, it is thought that images respectively corresponding to the variations of the illumination condition, the direction/pose, the hiding, the expression and the like are previously registered for each person intended to be registered. That is, by previously holding, as the registration image, the image corresponding to the condition which is likely to occur when photographing, it is possible to improve recognition accuracy. However, previous preparation of a large number of registration images contradicts user-friendliness. Moreover, it is actually difficult to predict all the variation patterns and prepare the registration images corresponding to the predicted patterns.

In consideration of such inconvenience, Japanese Patent Application Laid-Open No. 2011-086265 adopts the method which can cope with a large variation with few patterns while paying attention to local portions. In this method, the pattern is divided into partial areas, and predetermined conversion is performed to the partial feature extracted from each partial area, thereby calculating the feature quantity which is robust to the variation. Here, it should be noted that the predetermined conversion can cope with the variations adaptively by switching parameters according to attributes such as the direction, the expression and the like of a person's face.

Moreover, in J. Wright and G. Hua "Implicit elastic matching with random projections for pose-variant face recognition", In Proc, CVPR, 2009, face recognition which is robust to a variation of pose is performed using a histogram of features quantized by random projection.

To calculate the variation-robust feature quantity by performing the conversion to the partial feature extracted from the local portion, it is necessary to hold a large number of parameters to be used for the conversion. For example, in case of performing the conversion using a linear operation as typified by main component analysis, if it is assumed that a previous feature dimension is N and a post-conversion feature dimension is M, then a parameter quantity is in proportion to N×M. In case of using the method which pays attention to the local portion, parameters as many as the number of the local portions are further necessary. Thus, the storage area increases to secure the parameters as data. Besides, the memory band for reading the parameter to the memory area when performing the conversion operation increases, so that the power consumption increases. As a result, various problems occur.

However, in the above non-patent literature, any problem of parameter or process quantity is not at all considered. Meanwhile, in the method described in Japanese Patent Application Laid-Open No. 2011-086265, the conversion which is normally performed in two steps is performed in one step, thereby reducing the parameter quantity. However, even in this method, since the parameter quantity increases in proportion to the product of the number of dimensions of the feature quantity and the number of dimensions of the post-conversion feature quantity, and the number of the local portions as described above, essential improvement is not performed yet.

The present invention aims to reduce the holding quantity of the parameters for reducing the number of dimensions of the feature quantity extracted from the image and reduce the number of dimensions of the feature quantity by using the high-accuracy parameter.

SUMMARY OF THE INVENTION

According to one aspect of the present invention, there is provided an image recognizing apparatus comprising: an extracting unit configured to extract a partial feature quantity from an object in each of a registration image and an input image; a compressing unit configured to reduce a dimension of the partial feature quantity extracted by the extracting unit; a storing unit configured to store the partial feature quantity of the object in the registration image of which the dimension has been reduced by the compressing unit; and a calculating unit configured to calculate similarity between the object in the input image and the object in the registration image, using the partial feature quantity of the object in the input image of which the dimension has been reduced by the compressing unit and the partial feature quantity of the object in the registration image stored by the storing unit, wherein the compressing unit switches the reduction of the dimension of the partial feature quantity using a preset dimension compression parameter and the reduction of the dimension of the partial feature quantity by dynamically generating a dimension compression parameter.

Further features of the present invention will become apparent from the following description of exemplary embodiments with reference to the attached drawings.

DESCRIPTION OF THE EMBODIMENTS

First Embodiment

Hereinafter, the first embodiment of the present invention will be described in detail in accordance with the accompanying drawings.

Figure 1:
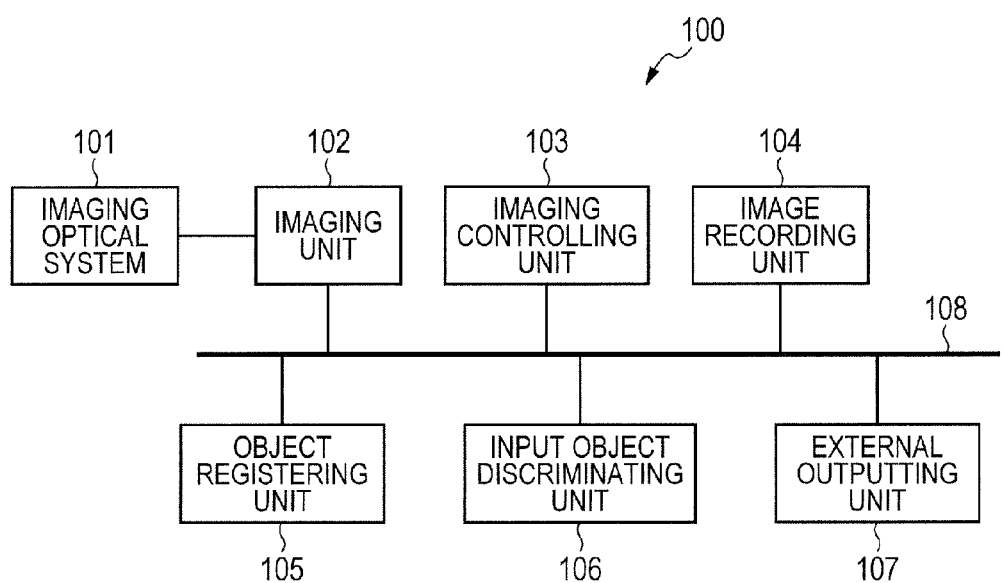
FIG. 1 is a block diagram illustrating a constitution of an object discriminating apparatus according to the embodiment of the present invention.

FIG. 1 is a block diagram illustrating a constitutional example of an object discriminating apparatus (an image recognizing apparatus) 100 according to the present embodiment. As illustrated in FIG. 1, the object discriminating apparatus 100 has an imaging optical system 101, an imaging unit 102, an imaging controlling unit 103, an image recording unit 104, an object registering unit 105, an input object discriminating unit 106 and an external outputting unit 107. These units are connected with each other by a connection bus 108.

Incidentally, the object registering unit 105 and the input object discriminating unit 106 also may be typically a dedicated circuit (ASIC (Application Specific Integrated Circuit)) and a processor (a reconfigurable processor, a DSP (Digital Signal Processor), a CPU (Central Processing Unit) or the like) respectively. Also, it may exist as a program to be executed at the inside of a single dedicated circuit and a general-purpose circuit (CPU).

The imaging optical system 101 is composed of an optical lens having a zooming mechanism. Also, a pan/tilt driving mechanism may be equipped. The imaging unit 102 typically has a CCD (Charge Coupled Device) or a CMOS (Complementary Metal Oxide Semiconductor) image sensor, and a predetermined video signal (for example, a signal which can be obtained by performing the subsampling and the block reading) is output as image data by a readout control signal from a sensor driving circuit (not illustrated).

The imaging controlling unit 103 controls a timing of actually taking a photograph based on an angle-of-view adjustment, an instruction such as a depression of a shutter button or the like and information which is output from the object registering unit 105 or the input object discriminating unit 106. The image recording unit 104, which is composed of a semiconductor memory or the like, stores image data transferred from the imaging unit 102 into a memory and transfers the image data with a predetermined timing in accordance with a request from the object registering unit 105 or the input object discriminating unit 106.

The object registering unit 105 extracts information of an object, which is targeted to be discriminated, from the image data and registers and holds the extracted information. The detailed constitution of the object registering unit 105 and the specific contents of the process to be actually performed at the object registering unit 105 will be described later. The input object discriminating unit 106 discriminates the object based on image data which was input and image data which was obtained from the object registering unit 105. The specific constitution of the input object discriminating unit 106 and the details of the process to be performed will be also described later.

The external outputting unit 107, which is, for example, a monitor such as a TFT (Thin Film Transistor) liquid crystal display, displays an image related to image data obtained from the imaging unit 102 and the image recording unit 104. A discriminated result obtained by the input object discriminating unit 106 is displayed by superimposing it on an image. It may be such a form of outputting the discriminated result obtained by the input object discriminating unit 106 to an external memory or the like as electronic data. The connection bus 108 is used to connect the above units with others.

<Overall Flow>

Figure 2:
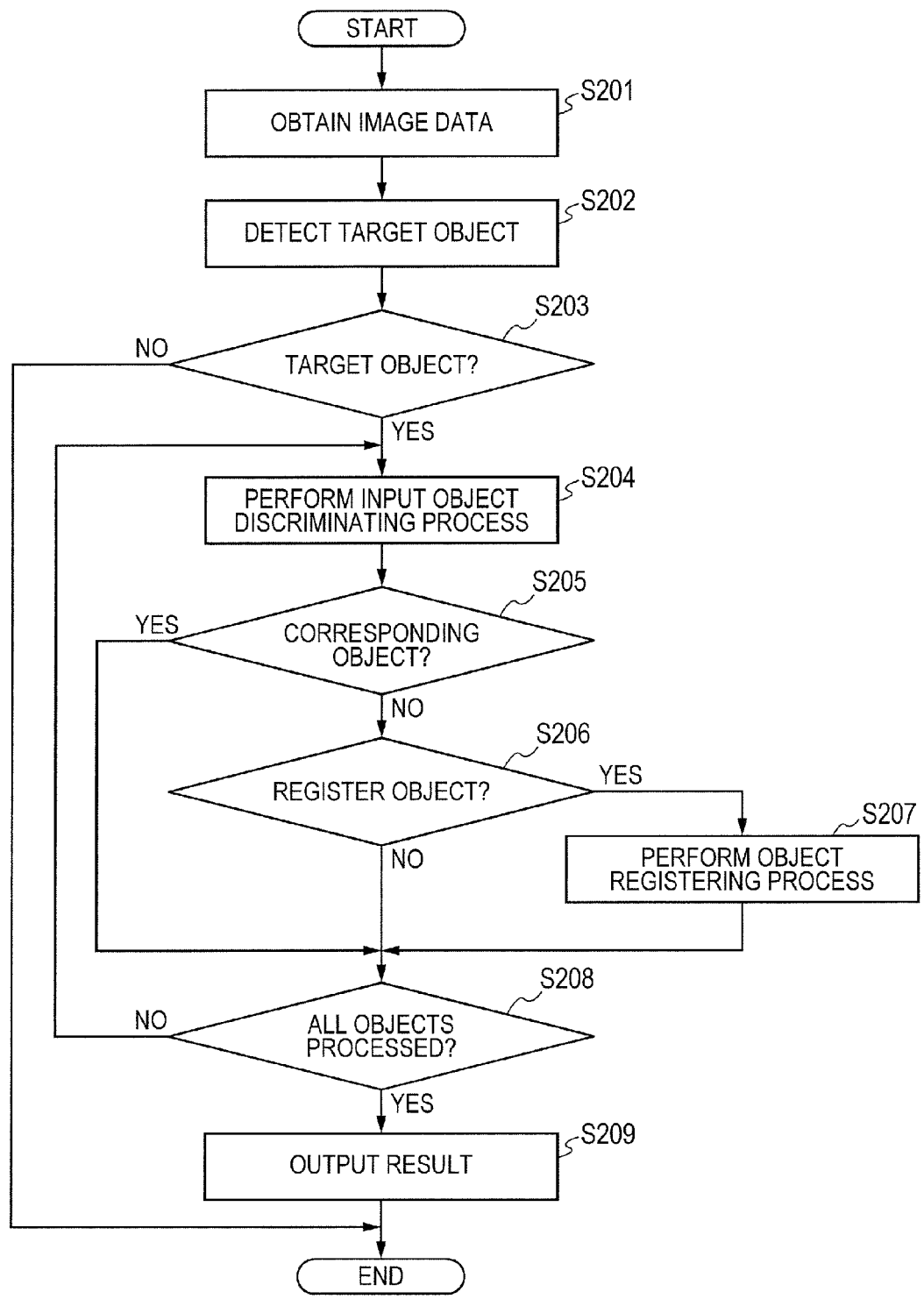
FIG. 2 is a flow chart indicating an example of an entire processing procedure to be performed by the object discriminating apparatus.

FIG. 2 is a flow chart indicating an example of an entire processing procedure to be performed by the object discriminating apparatus 100 in the present embodiment. Hereinafter, it will be described about the actual process, where the object discriminating apparatus 100 of the present embodiment discriminates the object, with reference to FIG.

2. Incidentally, in the description of FIG. 2, it will be described about a case that the object in an image is a person's face.

First, in S201, the input object discriminating unit 106 obtains the image data from the image recording unit 104. Subsequently, in S202, the person's face is detected from the obtained image. As to a method of detecting the person's face from an image, a known technique may be used (e.g., P. Viola and M. Jones, "Robust real-time face detection", pp. 747, Eighth International Conference on Computer Vision (ICCV' 01), Volume 2, 2001).

Next, in S203, the input object discriminating unit 106 decides whether or not the person's face exists in the image according to a result of the process performed in S202. As a result of this decision, when the person's face exists, a discriminating process of the object, that is, the discriminating process of an individual is performed in S204. The specific processing contents of the object discriminating process performed in S204 will be described later. On the other hand, as a result of decision in S203, when the person's face does not exist, the process is terminated as it is.

Next, in S205, the input object discriminating unit 106 decides whether or not a face which corresponds to a registered person exists from a result of the discriminating process. As a result of this decision, when a person of the detected face is identical with the registered person, a flow advances to S208. On the other hand, when the person of the detected face does not coincide with anyone of the registered persons, the object registering unit 105 decides whether or not registering that person in S206. As to the decision whether or not performing the registration, the decision may be performed in accordance with the current setting, and it is allowable to make a user determine whether or not performing the registration on the spot, for example, through an external interface, a GUI (Graphical User Interface) or the like.

As a result of the decision in S206, when the person is registered, the object registering unit 105 performs a registering process of the person's face in S207. The details of this process will be described later. On the other hand, as the result of the decision in S206, when the person is not registered, a flow advances to S208 as it is.

Next, in S208, the imaging controlling unit 103 decides whether or not the processes were terminated for all of the detected objects (persons). As a result of this decision, when the unprocessed object exists, a flow returns to S204. On the other hand, when the processes were terminated for all of the objects, a result of a series of the discriminating processes is output to the external outputting unit 107 in S209, and the process is terminated.

<Object Registering Unit 105>

Figure 3:
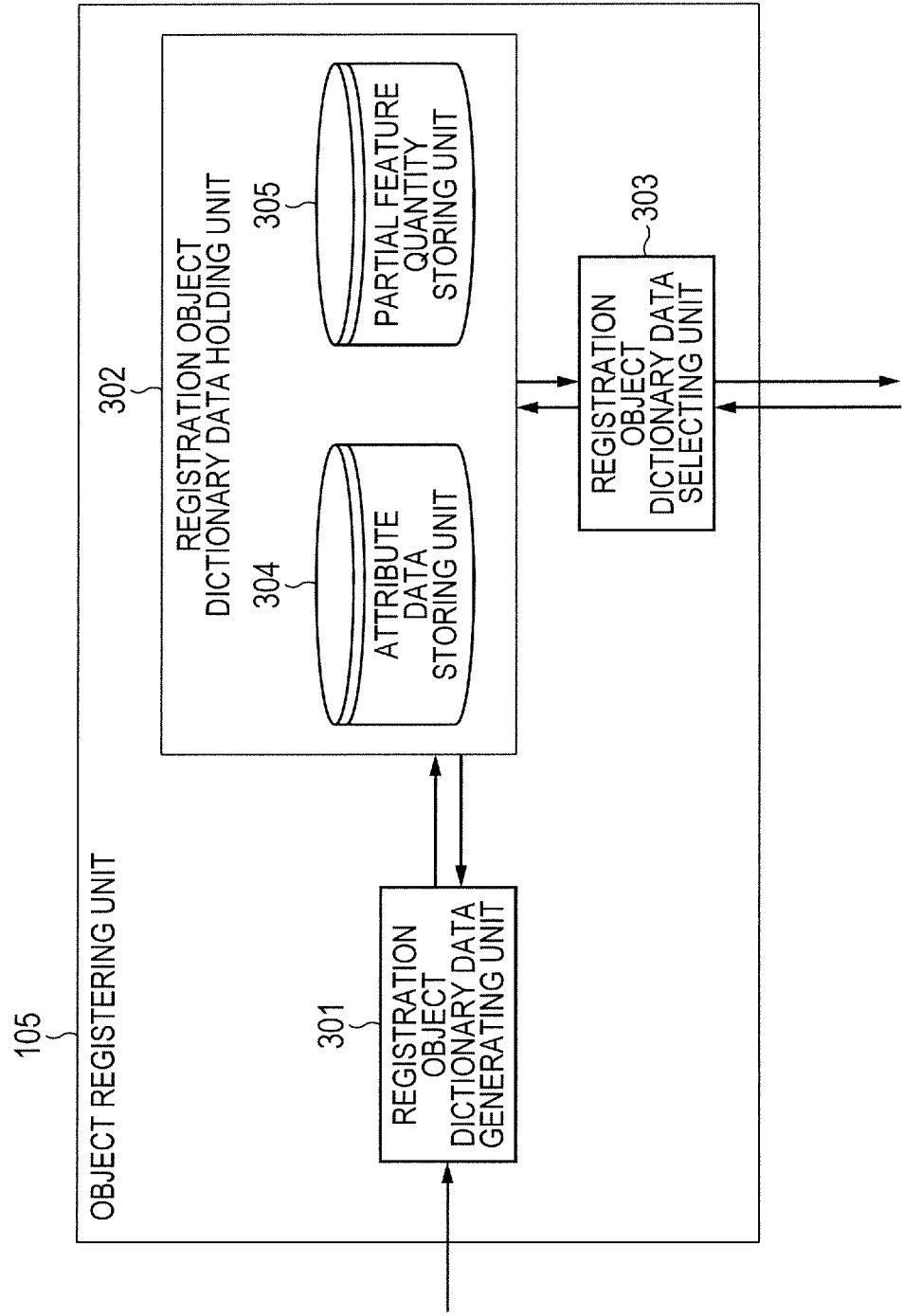
FIG. 3 is a block diagram illustrating a detailed constitutional example of an object registering unit.

First, the details of an object registering process to be performed in S207 will be described. FIG. 3 is a block diagram illustrating a detailed constitutional example of the object registering unit 105 illustrated in FIG. 1. As illustrated in FIG. 3, the object registering unit 105 has a registration object dictionary data generating unit 301, a registration object dictionary data holding unit 302 and a registration object dictionary data selecting unit 303.

The registration object dictionary data generating unit 301 generates dictionary data, which is necessary for discriminating an individual of the object, from the image data obtained from the image recording unit 104. The specific contents of the process to be performed in the registration object dictionary data generating unit 301 will be described later. Attribute data and the partial feature quantity to be described later are included in the dictionary data.

The registration object dictionary data holding unit 302, which has an attribute data storing unit 304 and a partial feature quantity storing unit 305, holds the dictionary data generated by the registration object dictionary data generating unit 301. The attribute data storing unit 304 holds attributes of the object to be registered, for example, when the object is a person's face, attribute data of sex, age, look, face direction and the like among the dictionary data. The attribute data may be such data which is obtained by the registration object dictionary data generating unit 301 or such data which is input by a user when performing the registration. The partial feature quantity storing unit 305 holds the partial feature quantity extracted by the registration object dictionary data generating unit 301.

The registration object dictionary data selecting unit 303 reads out necessary dictionary data from the registration object dictionary data holding unit 302 in accordance with a request of the input object discriminating unit 106 to be described later and then transfers that dictionary data to the input object discriminating unit 106.

<Registration Object Dictionary Data Generating Unit 301>

Figure 4:
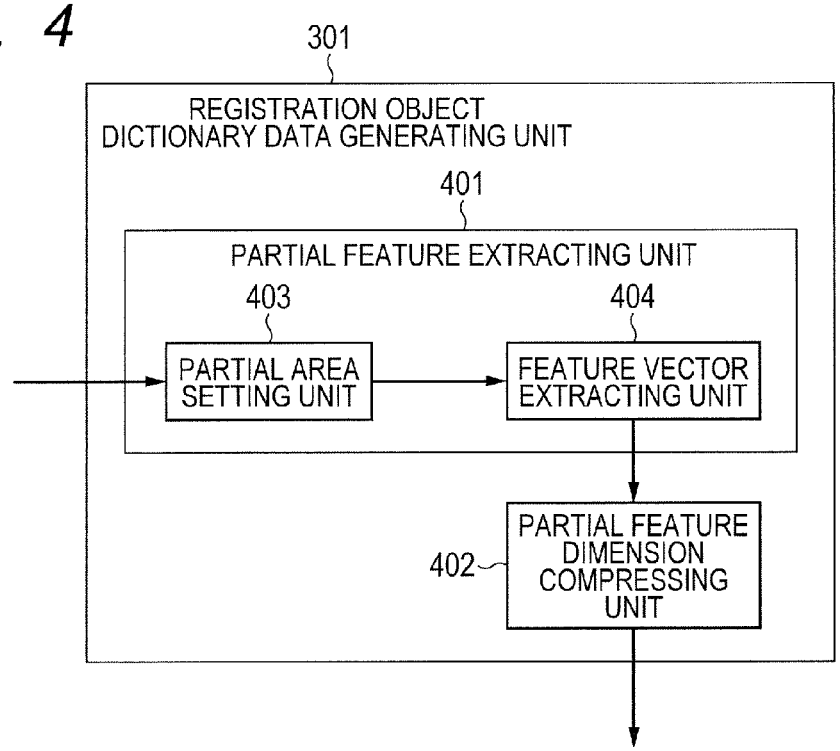
FIG. 4 is a block diagram illustrating a detailed constitutional example of a registration object dictionary data generating unit.

FIG. 4 is a block diagram illustrating a detailed constitutional example of the registration object dictionary data generating unit 301 illustrated in FIG. 3. As illustrated in FIG. 4, the registration object dictionary data generating unit 301 has a partial feature extracting unit 401 and a partial feature dimension compressing unit 402.

The partial feature extracting unit 401 extracts a feature vector (hereinafter referred to as a partial feature quantity vector) from an image which includes an object to be targeted. The partial feature extracting unit 401 is further composed of a partial area setting unit 403 and a feature vector extracting unit 404. The partial area setting unit 403 sets a position and a range of a partial area from where the feature vector extracting unit 404 extracts the partial feature quantity vector. It is preferable that the position and the range of the partial area are previously determined by using a machine learning method. As to the number of the partial areas, although the predetermined number is previously determined in accordance with the processing time or the like, this number may be determined by measuring the number, by which sufficient discriminating performance can be obtained for a previously prepared learning sample.

The feature vector extracting unit 404 extracts the partial feature quantity vector from data of an object for registration. When an object to be targeted is a person's face, a process of extracting data, which is necessary for the discrimination, from an image, which includes a face, is performed. Specifically, as the data necessary for discrimination, a luminance value of the partial area is extracted from the partial area set by the partial area setting unit 403 as one of the partial feature quantity vectors.

As the feature quantity unchangeable to a position of a partial area of the object or as the feature quantity robust to the fluctuation of a position other than the luminance value, for example, a frequency distribution of the luminance may be extracted as the partial feature quantity vector. In addition, as the feature quantity unchangeable or robust to the fluctuation of a position of the partial area, phase information obtained by Fourier transforming an image which includes the object may be treated as the partial feature quantity vector. Further, a filter calculation result obtained by extracting edge information of an image may be extracted as the partial feature quantity vector other than the above feature quantity robust to the fluctuation of a position. Specifically, a result obtained by performing a representative spatial filtering calculation such as a Sobel filtering calculation or a Gabor filtering calculation is extracted as the partial feature quantity vector. The frequency distribution of the edge information according to the spatial filtering calculation as described above is taken, and that frequency distribution may be treated as the partial feature quantity vector. The frequency distribution is relatively robust to the fluctuation of a position, and there is an effect of making the feature based on the edge information robust to the displacement.

The partial feature dimension compressing unit 402 compresses the dimension of the partial feature quantity vectors of a partial area extracted by the feature vector extracting unit 404. Hereinafter, it will be described about the detailed constitution of the partial feature dimension compressing unit 402 and the processes to be performed.

<Partial Feature Dimension Compressing Unit 402>

Figure 5:
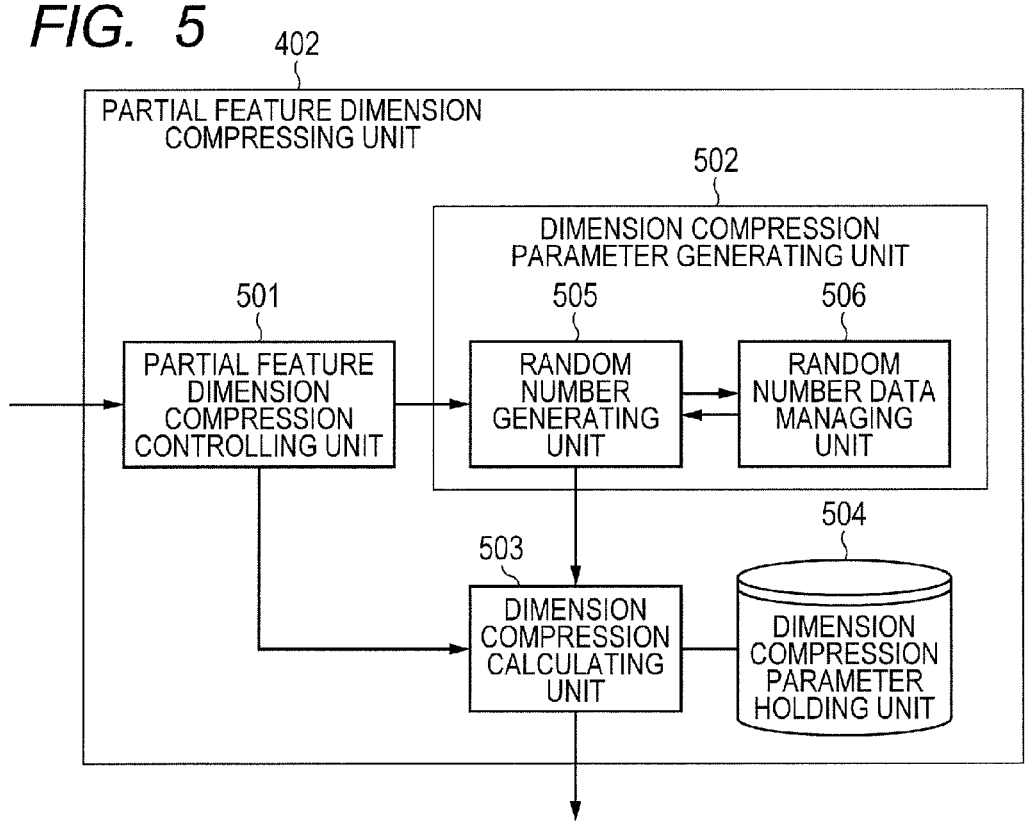
FIG. 5 is a block diagram illustrating a detailed constitutional example of a partial feature dimension compressing unit according to the first embodiment.

FIG. 5 is a block diagram illustrating a detailed constitutional example of the partial feature dimension compressing unit 402 illustrated in FIG. 4. As illustrated in FIG. 5, the partial feature dimension compressing unit 402 has a partial feature dimension compression controlling unit 501, a dimension compression parameter generating unit 502, a dimension compression calculating unit 503 and a dimension compression parameter holding unit 504.

The partial feature dimension compression controlling unit 501 controls the dimension compressing process to be performed in the dimension compression calculating unit 503 in accordance with the partial feature quantity vector obtained from the partial feature extracting unit 401. Typically, it is switched between states whether or not the parameter to be used for the dimension compression was previously held and whether or not the parameter is dynamically generated in accordance with an attribute of the partial feature quantity vector, to which the dimension compression is performed. In any case, the specific contents will be described later.

When the parameter to be used for the dimension compression is dynamically generated, the dimension compression parameter generating unit 502 dynamically generates the parameter which is used to perform a compression operation (dimension compression) at the dimension compression calculating unit 503. In addition, the dimension compression parameter generating unit 502 further includes a random number generating unit 505 and a random number data managing unit 506. The random number generating unit 505 performs a process of generating random numbers with a predetermined method. The random number data managing unit 506 manages the random numbers generated at the random number generating unit 505.

The dimension compression calculating unit 503 performs a compression operation of the partial feature quantity vector by using parameters generated at the dimension compression parameter generating unit 502 or parameters held in the dimension compression parameter holding unit 504. The dimension compression parameter holding unit 504 holds a parameter which is used in case of performing the compression operation at the dimension compression calculating unit 503, for example, holds an average vector of the partial feature quantity vectors. Here, the average vector of the partial feature quantity vectors is such a vector obtained by the process that the partial feature quantity vectors are extracted from the previously prepared learning sample and then an average of respective elements of the partial feature quantity vectors is calculated. The details of the process to be performed in the dimension compression calculating unit 503 or specific parameters other than the average vector held by the dimension compression parameter holding unit 504 will be described later.

Here, the meaning of performing the dimension compression to the partial feature quantity vector will be described. There are two main purposes of performing the dimension compressing process of the partial feature quantity vector, and the one purpose is to improve the accuracy. An influence of the fluctuation, which is not essential for the authentication of slight illumination and expression, is eliminated by selecting the dimension which has essential information of data and reducing another dimension by an analysis of main components in case of performing the dimension compression, and an effect of improving the accuracy is expected. The second purpose is to reduce the data amount. In the object authentication, since the all partial feature quantity vectors have to be stored regarding the object registered by a user, when the dimension of the partial feature quantity vectors becomes smaller, the data amount can be more reduced. Therefore, in case of considering an actual system, the dimension compression of the partial feature quantity vectors is the very important process practically.

Figure 6:
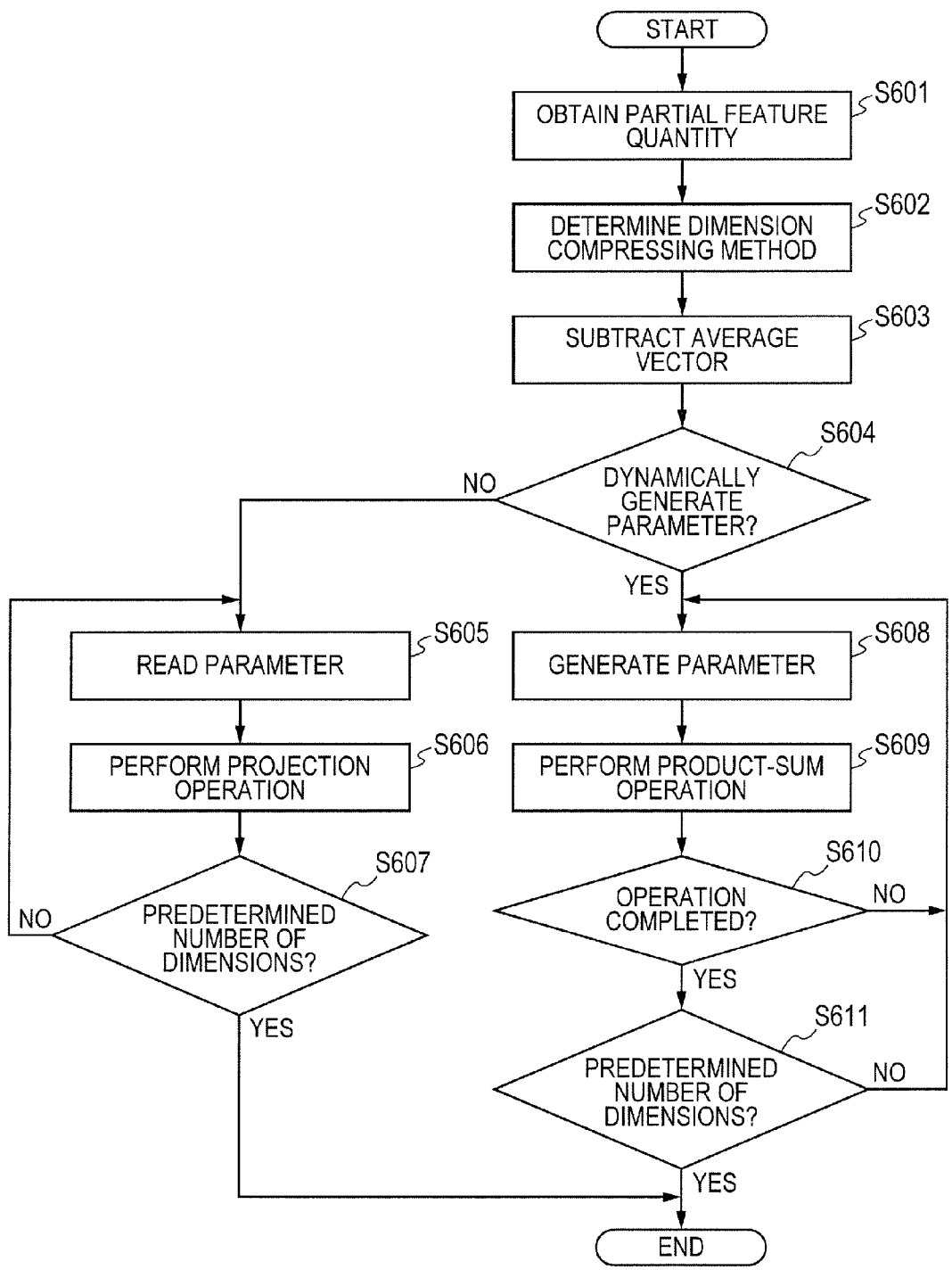
FIG. 6 is a flow chart indicating an example of a processing procedure of compressing the number of dimensions of a partial feature quantity, in the first embodiment.

FIG. 6 is a flow chart indicating an example of a processing procedure to be performed by the partial feature dimension compressing unit 402. Hereinafter, it will be described about a process of dimensionally compressing the partial feature quantity with reference to FIG. 6.

First, in S601, the partial feature dimension compression controlling unit 501 obtains the partial feature quantity (partial feature quantity vector) extracted at the partial feature extracting unit 401. Accompanying attribute information such as a position or size of a partial area on the object, the kind of feature quantity and the like are also included in the partial feature quantity to be obtained here.

Subsequently, in S602, the partial feature dimension compression controlling unit 501 determines a method of the dimension compressing process to be performed to the obtained partial feature quantity. The dimension compressing method is previously set corresponding to the attribute of the partial feature quantity, and the method is determined by reading the attribute of the partial feature quantity obtained in S601. Here, the dimension compressing method is determined by determining items such as an obtaining method of a parameter for the dimension compression, an average vector of the corresponding partial feature quantity, the number of dimensions after performing the dimension compression or the like.

As to an obtaining method of the parameter, there are two methods of dynamically generating the parameter used for the dimension compression or reading out the previously prepared parameters, and these methods are switched by deciding for each the partial feature quantity. Incidentally, the contents of this parameter will be described later. The number of dimensions after performing the dimension compression is the number of dimensions of the partial feature quantity vector, which is the partial feature quantity to be output by a post-compressing process.

In an obtaining method of the parameter for the dimension compression or a method of previously setting the number of dimensions after performing the dimension compression, a machine learning method can be used similar to a case of determining an area of the partial feature quantity. Specifically, plural candidates of partial feature quantity vectors obtained by changing the parameters and the number of dimensions after performing the dimension compression are prepared, and these may be selected by using the machine learning method by treating the discrimination performance as an evaluation function.

When the dimension compressing method is determined, the control to standardize parameters for the dimension compression may be performed. Generally, it is desirable to prepare the parameter to be used for the dimension compression for each partial area. Typically, for example, the partial feature quantity vector is extracted from learning data for each partial area, and a learning process is performed by using the machine learning method such as an analysis of main components, and an optimal parameter for the dimension compression is prepared for each partial area.

On the other hand, in order to reduce amount of the parameter for the dimension compression according to a purpose of reducing the data amount, the parameter for the same dimension compression may be used at plural partial areas. For example, in a case that the kind of the partial feature quantity is the same kind and partial areas are comparatively in the close positional relationship, since it is considered that the parameters for the dimension compression obtained by the machine learning method are also comparatively similar with each other, the parameters can be standardized. In addition, when the learning process is performed by the machine learning method such as an analysis of main components or the like, the standardized parameter for the dimension compression may be obtained by learning the partial feature quantity vector to the plural partial areas at one time.

When the parameters for the dimension compression are dynamically generated by the random numbers, if the parameters for the dimension compression are standardized at each partial area, the parameters can be easily generated. When the parameters for the dimension compression are the random numbers, a state that a different random number sequence is set for each partial area does not have any special meanings, and the parameters also may be in a standardized state. When the parameters for the dimension compression are dynamically generated by the random numbers, although the amount of parameters does not become a problem, since it becomes possible to reduce a period of the random numbers to a short period of time by standardizing the parameters between the partial areas, the load of the process for generating the random numbers can be reduced.

As for a matter that the parameters for the dimension compression are to be actually standardized at what partial area, it may be determined by preparing the actually standardized parameters for the dimension compression and selecting the standard after fixing the standard such as the recognition performance, a predetermined processing quantity or the like by the machine learning method.

It is return to the description of FIG. 6, and next, in S603, the dimension compression calculating unit 503 obtains an average vector according to attributes of the partial feature quantity from the dimension compression parameter holding unit 504 and subtracts the average vector from the partial feature quantity vectors. Here, the attributes of the partial feature quantity to be referred are, typically, the kind, position, size and the like of the partial feature quantity. Since the number of dimensions of the partial feature quantity is fixed by these attributes, the number of dimensions of the average vector to be obtained is also coincident with the above number of dimensions. When the original partial feature quantity vector is defined as v and the average vector is defined as m, the partial feature quantity vector x to be obtained can be calculated by the following expression (1).

$$X = v - m \quad (1)$$

Next, in S604, the partial feature dimension compression controlling unit 501 decides an obtaining method of the parameter in accordance with the dimension compressing method determined in S602. As a result of this decision, when the parameter is not dynamically generated, the dimension compression calculating unit 503 reads out the necessary parameter from the dimension compression parameter holding unit 504 in S605. A parameter group obtained by using a predetermined method is previously held in the dimension compression parameter holding unit 504. Typically the parameter group obtained by using a method such as an analysis of main components (PCA: Principal Component Analysis), Locality Preserving Projections (LPP) or the like is held. Next, in S606, the dimension compression calculating unit 503 performs a projection operation by using a projection matrix A. The projection operation is performed by the following expression (2).

$$Y = Ax \quad (2)$$

Here, a symbol "x" denotes the partial feature quantity vector before performing the dimension compression calculated in S603, a symbol "y" denotes the partial feature quantity vector after performing the dimension compression, and a symbol "A" denotes the projection matrix. When the number of dimensions of the partial feature quantity vector x before performing the dimension compression is defined as d and the number of dimensions of the partial feature quantity vector y after performing the dimension compression is defined as m, the projection matrix A is represented as a matrix of d×m dimensions. Parameters to be read out in S605 correspond to values of respective elements of the projection matrix A. The i-th component of the partial feature quantity vector y after performing the dimension compression is given by the following expression (3).

$$y_i = \sum_{j=0}^{d} A_{ij} x_j \quad (3)$$

In addition, the projection matrix A indicated in the expression (2) is not obtained by the Principal Component Analysis, but the respective elements of the projection matrix A also can be made into the random numbers. In this case, the projection operation represented by the expression (2) or (3) is assumed to be called a random projection in the following.

In S606, the process corresponding to the expression (3) is performed. Then, in next S607, the dimension compression calculating unit 503 decides whether or not this projection process was performed by the predetermined number of times (m times). As a result of this decision, when the number of processing times does not reach the predetermined number of times, the order "i" is updated to "i+1", and a flow returns to S605. On the other hand, as a result of the decision in S607, the projection process was performed by the predetermined number of times, and when the number of processing times reached the number of dimensions m of the partial feature quantity vector, the process is terminated.

On the other hand, as a result of the decision in S604, when the parameter is dynamically generated, the dimension compression parameter generating unit 502 generates the parameter for the dimension compression in S608. The parameters to be generated here are elements of the projection matrix A, and typically, the parameters correspond to a projection matrix $A_{ij}$ indicated in the expression (3). When the parameters for the dimension compression are generated, it is preferable that the common parameter is generated between the partial feature quantities by properly performing the initialization. Specifically, the random number generating unit 505 performs the initialization of a random number sequence on the basis of management information of the random number data managing unit 506. For example, the initialization is performed at the timing when the partial feature quantity was switched, and even when the partial feature quantity vector is changed, the same parameter is made to be used for an element at the same order (i-th component).

Next, in S609, the dimension compression calculating unit 503 performs a product-sum operation of the elements of the partial feature quantity vector and the parameters generated in S608. In this process, as to the product of the projection matrix $A_{ij}$ and the partial feature quantity vector $X_j$, the sum operations thereof are performed from j=0. Next, in S610, the dimension compression calculating unit 503 decides whether or not the product-sum operation in the expression (3) is completed. That is, it is decided whether or not an element number j of the partial feature quantity vector before performing the compression reaches the number of dimensions d of the original partial feature quantity vector. As a result of this decision, when the product-sum operation is not completed, the order "j" is updated to "j+1", and a flow returns to S608.

On the other hand, as a result of decision in S610, when the product-sum operation is completed, the dimension compression calculating unit 503 decides whether or not all elements of the partial feature quantity vector after performing the compression are calculated in S611. Since the process of this decision is similar to that of S607, the description will be omitted. As a result of this decision, when the element number does not reach the number of dimensions m, a flow returns to S608, and when the element number reaches the number of dimensions m, the process is terminated.

Here, the reason that a flow is branched due to a selection whether or not the parameter for the dimension compression is dynamically generated by a process in S604 will be described. As described above, respective elements of the projection matrix A in the expression (2) are stored in the dimension compression parameter holding unit 504. Further, since the projection matrix A is prepared for each partial feature quantity vector, when the resource is limited as in case of a built-in device, all the parameters cannot be developed in a working memory or the like.

Therefore, in order suppress the manufacturing cost, it is preferable that these parameters are held in a nonvolatile storage device, a low-cost temporary storage device with a low speed or the like and read out the parameters when using them. Therefore, in processes from S605 to S607, the quantity of data, which is read out from such the storage device to the working memory, becomes a large quantity. Since a lot of time is necessary to read out the data, it is required to perform the process at a speed as fast as possible. However, if a wider band of the memory is secured to perform the process at a high speed, there occurs such a problem of increasing the power consumption. In this manner, if a method that the parameters for the dimension compression are previously prepared and the parameters are read out when performing the process is adopted, it is difficult to achieve both the improvement of processing speed and the reduction of the power consumption.

On the other hand, in processes from S608 to S611, since the parameters for the dimension compression are dynamically generated, the parameters are not required to be previously stored in a storage device or the like. In addition, when the parameters are dynamically generated, since the parameters are immediately used, it is not required to secure a wide memory band.

Here, it will be described about the relationship between accuracy and implementation efficiency. Generally, there are many cases of high accuracy in case of previously determining a projected base by the machine learning method such as an analysis of main components rather than a case of using random number data for the projected base. This fact also depends on the relationship between the number of dimensions d of the partial feature quantity before performing the dimension compression, the number of dimensions m of the partial feature quantity after performing the dimension compression and accuracy to be obtained. In case of authentication of the object, when the number of dimensions d before performing the dimension compression is large and the number of dimensions m after performing the dimension compression is comparatively small, there are many cases capable of obtaining sufficient accuracy by the dimension compression according to the random numbers. On the other hand, when the number of dimensions d before performing the dimension compression is small and the number of dimensions m after performing the dimension compression is comparatively large, there are many cases of appearing the deterioration of accuracy at a significant level for the dimension compression parameters obtained by the machine learning method.

As described above, actually, the accuracy is obtained by respective methods based on the machine learning and the random numbers by treating the accuracy as an objective function, and a suitable parameter may be selected for each the partial feature quantity by the machine learning method. Further, the parameter for the dimension compression, which is optimum for the implementation, can be determined by including processing cost (number of calling times of parameters or necessary memory band) in the objective function.

<Input Object Discriminating Unit 106>

Figure 7:
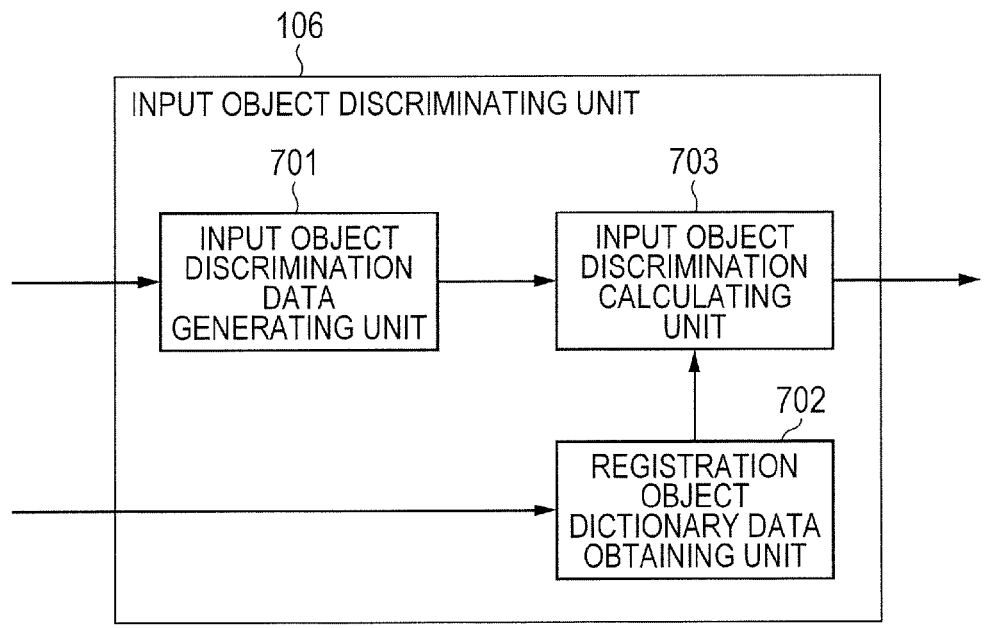
FIG. 7 is a block diagram illustrating a detailed constitutional example of an input object discriminating unit.

Next, a process of discriminating an input object will be described. FIG. 7 is a block diagram illustrating a detailed constitutional example of the input object discriminating unit 106 illustrated in FIG. 1. As illustrated in FIG. 7, the input object discriminating unit 106 has an input object discrimination data generating unit 701, a registration object dictionary data obtaining unit 702 and an input object discrimination calculating unit 703.

The input object discrimination data generating unit 701 obtains image data from the image recording unit 104 and extracts discrimination data necessary for discriminating an object targeted to be discriminated. The registration object dictionary data obtaining unit 702 obtains dictionary data necessary for discriminating the input object from the object registering unit 105. The input object discrimination calculating unit 703 performs the discriminating process of the object by using the discrimination data obtained from the input object discrimination data generating unit 701 and the dictionary data obtained from the registration object dictionary data obtaining unit 702. The processes to be performed here will be described later.

Figure 8:
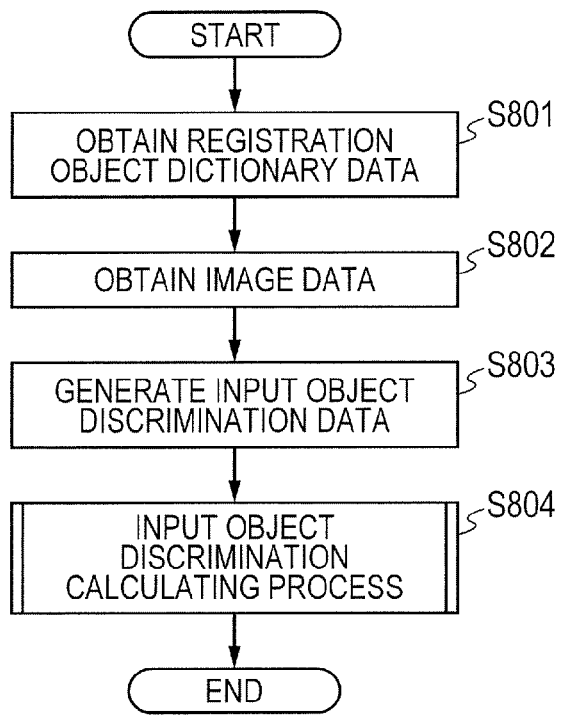
FIG. 8 is a flow chart indicating an example of a processing procedure of discriminating an input object.

FIG. 8 is a flow chart indicating an example of a processing procedure to be performed in the input object discriminating unit 106. First, in S801, the registration object dictionary data obtaining unit 702 obtains dictionary data of the registration object from the object registering unit 105. Next, in S802, the input object discrimination data generating unit 701 obtains image data (input image) including the input object from the image recording unit 104. Subsequently, in S803, the input object discrimination data generating unit 701 generates the discrimination data for discriminating the input object. Details of the processes to be performed here will be described later.

Next, in S804, the input object discrimination calculating unit 703 performs a calculating process for discriminating the input object. As a result of this calculating process, as to the result whether or not the input object data coincides with the registered data (dictionary data), a case that the result is output by binary data (0 or 1) and a case that normalized output values are output as likelihood or similarity (for example, real numbers 0 to 1) are considered. Further, when there are plural registration objects, the likelihood also may be output for each registration object, and only the result for the most coincided registration object may be output.

Instead of the likelihood for the registration object, the likelihood for a class, to which the registration object belongs, may be output. For example, in case of discriminating a person, instead of the likelihood for the respective registration face images, the likelihood for an ID (name) of a person is to be output. Note that the specific contents of the calculating process for discriminating the input object will be described later.

<Input Object Discrimination Data Generating Unit 701>

Figure 9:
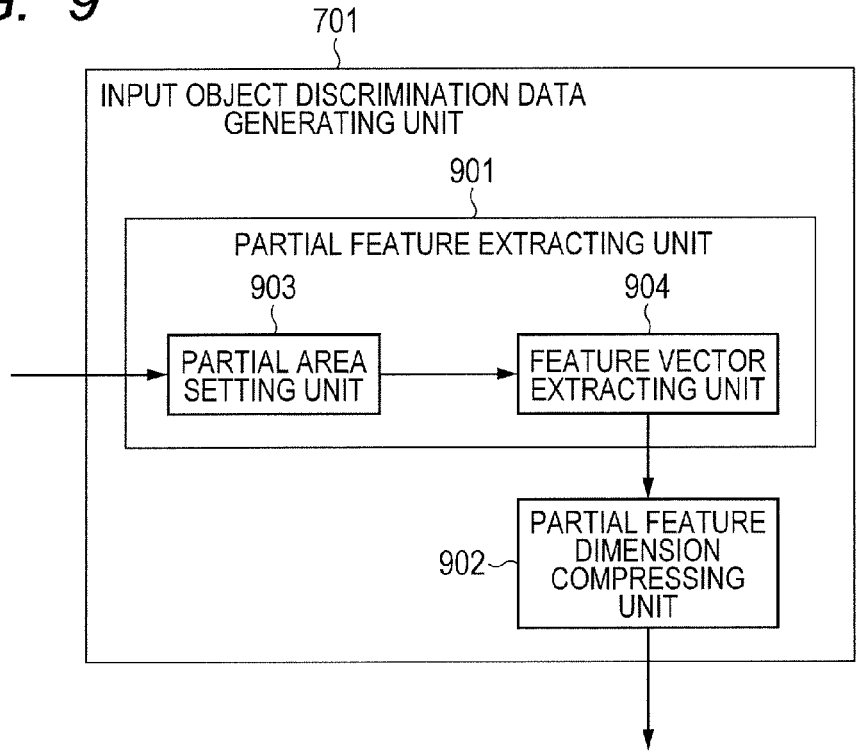
FIG. 9 is a block diagram illustrating a detailed constitutional example of an input object discrimination data generating unit.

FIG. 9 is a block diagram illustrating a detailed constitutional example of the input object discrimination data generating unit 701 illustrated in FIG. 7. As illustrated in FIG. 9, the input object discrimination data generating unit 701 has a partial feature extracting unit 901 and a partial feature dimension compressing unit 902. In addition, the partial feature extracting unit 901 has a partial area setting unit 903 and a feature vector extracting unit 904. Since the constitution of the input object discrimination data generating unit 701 and the process to be performed by each of the constitutional units are respectively similar to those of the registration object dictionary data generating unit 301 illustrated in FIG. 4, a detailed description thereof will be omitted. Also as to a compressing procedure of the number of dimensions of the partial feature quantity, the description will be similarly omitted.

<Input Object Discrimination Calculating Process>

Next, a calculating process for discriminating the input object will be described. In the present embodiment, as an example, it will be described about a case, where the discrimination of the input object is decided on the basis of the similarity between the partial feature quantities corresponding to the registration object and the input object.

Figure 10:
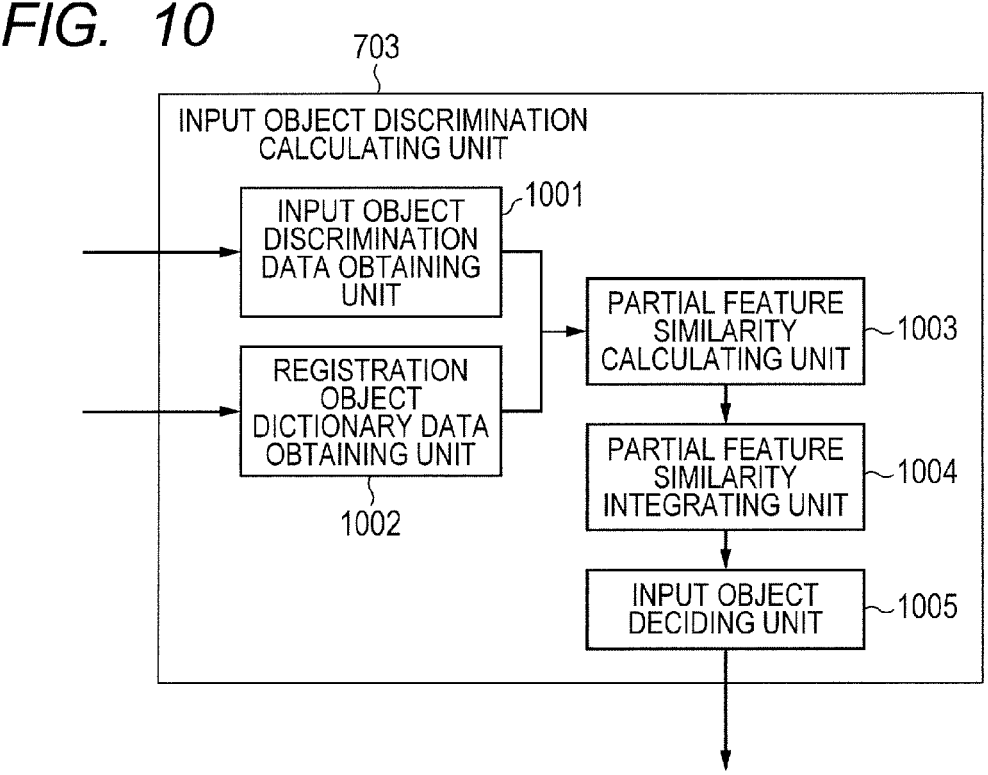
FIG. 10 is a block diagram illustrating a detailed constitutional example of an input object discrimination calculating unit.

FIG. 10 is a block diagram illustrating a detailed constitutional example of the input object discrimination calculating unit 703 illustrated in FIG. 7. As illustrated in FIG. 10, the input object discrimination calculating unit 703 has an input object discrimination data obtaining unit 1001 and a registration object dictionary data obtaining unit 1002 and further has a partial feature similarity calculating unit 1003, a partial feature similarity integrating unit 1004 and an input object deciding unit 1005.

Figure 11:
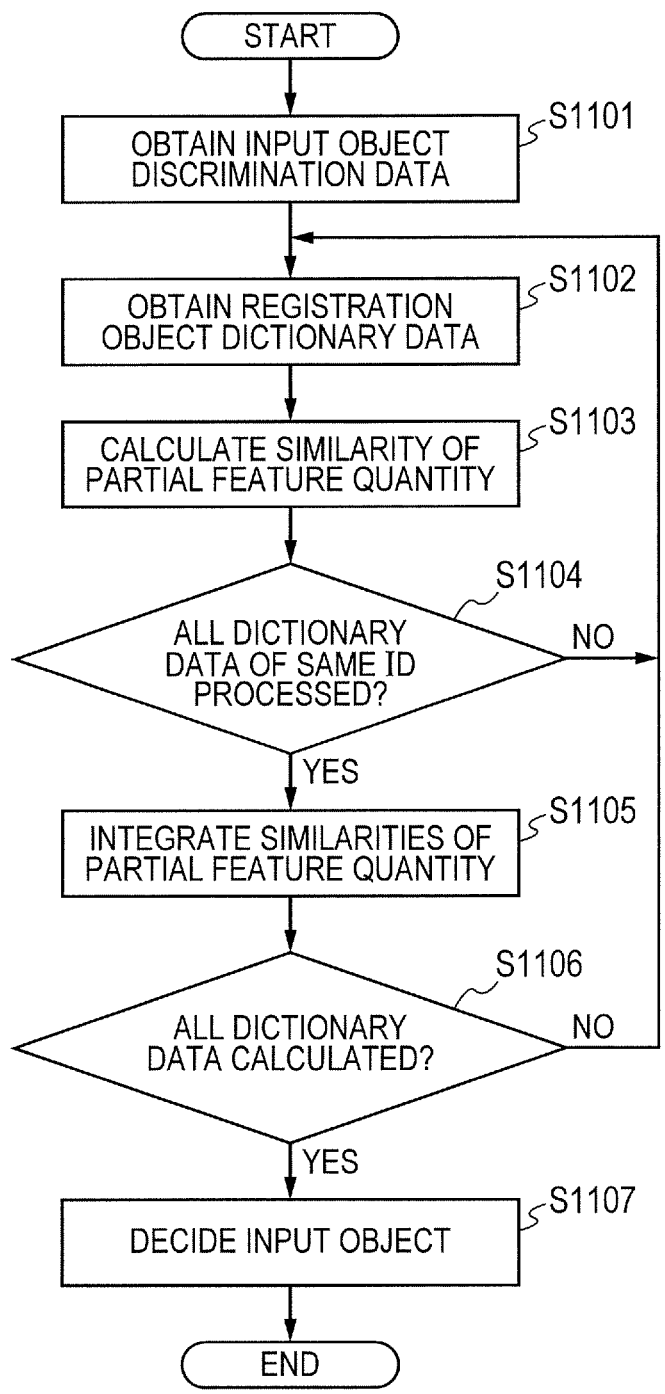
FIG. 11 is a flow chart indicating an example of the detailed processing procedure of discriminating the input object, in the first embodiment.

FIG. 11 is a flow chart indicating an example of a processing procedure to be performed by the input object discrimination calculating unit 703. Hereinafter, the process to be performed in each of the constitutional units illustrated in FIG. 10 will be described with reference to FIG. 11. First, in S1101, the input object discrimination data obtaining unit 1001 obtains the discrimination data of the input object from the input object discrimination data generating unit 701. Subsequently, in S1102, the registration object dictionary data obtaining unit 1002 obtains dictionary data of the registration object from the registration object dictionary data obtaining unit 702.

Next, in S1103, the partial feature similarity calculating unit 1003 calculates the similarity of the corresponding partial feature quantity from the obtained discrimination data of the input object and the obtained dictionary data of the registration object. In this process, the Euclidean distance between the respectively corresponding partial feature quantity vectors is obtained, and an inverse number of the obtained result is treated as the similarity. In addition, instead of the Euclidean distance, an inner product between the partial feature quantity vectors is calculated and an angle formed by that inner product may be treated as the similarity. Further, as a general distance, an inverse number of a Minkowski distance represented by the following expression (4) may be treated as the similarity.

$$L = \sqrt[b]{|x_1-y_1|^a + |x_2-y_2|^a + \ldots + |x_1-y_1|^a} \quad (4)$$

Here, two vectors x and y are respectively assumed to be one dimensional vector. In this case, necessary two parameters "a" and "b" may be previously determined such that the discriminating performance becomes the best performance in the evaluation samples.

Next, in S1104, the partial feature similarity calculating unit 1003 decides whether or not all the similarities are obtained as to the dictionary data which belongs to the same object (same ID). As a result of this decision, when the unprocessed dictionary data exists, a flow returns to S1102, and the dictionary data, which belongs to the same ID, is obtained, and the processes are repeated. On the other hand, the unprocessed dictionary data does not exist, a flow shifts to the next process.

Next, in S1105, the partial feature similarity integrating unit 1004 integrates the similarities obtained in S1103 for each partial feature quantity regarding the dictionary data, which belongs to the same ID, and further integrates the similarities into one similarity as a whole. For example, when three registration images exist for one object, three similarities are calculated for one partial area. The similarities can be integrated with a unit of the partial area by calculating an average value, a maximum value, a median value or the like for the three similarities in this same partial area (same ID).

Further, the similarity for each the partial area integrated as described above is finally integrated into the one similarity. As an integrating method at this time, for example, a simple average value may be calculated or a maximum value or a median value may be calculated. Also, the similarities processed by such a manner, where the respective similarities of the partial areas are sorted so as to precede the areas having the larger similarities and only the larger similarities of a predetermined percentage in the whole similarities are averaged (hereinafter, called a descending sort higher-similarity average), may be treated as the integrated similarity. By processing in this manner, when plural registration images exist, it becomes possible to integrate the similarities by using only the larger similarities, and the recognizing performance can be improved.

Next, in S1106, it is decided whether or not the above processes were performed for all the dictionary data. As a result of this decision, when the unprocessed dictionary data still exist, a flow returns to S1102 and the process is performed regarding the different ID. On the other hand, when the processes were performed for all the dictionary data, the input object deciding unit 1005 performs a deciding process of the input object in S1107.

Here, the deciding process of the input object is such a process, where it is decided that the input object corresponds to what the registration object considering the similarities with the dictionary data of the all registered object. Typically, an object, which takes the maximum value in the integrated similarity obtained in S1105, is assumed to be the registration object which corresponds to the input object, and a result of the above process is output. When the deciding process is performed, comparison between the input object and the registration object may be performed after integrating the similarities for the registration object having the same ID. Typically, an average value of the similarities for the same ID is calculated, and an object which takes the maximum value of the similarities is decided as an ID of the registration object which corresponds to the input object and then it may be output.

In the present embodiment, an operation whether previously prepared parameters are used or parameters are dynamically generated regarding parameters for the dimension compression to be used in case of dimensionally compressing the partial feature quantity vector is to be switched in accordance with the partial feature quantity. If the parameters for the dimension compression are previously obtained as a projection matrix by a method of an analysis of main components, generally the parameter quantity becomes a large amount, and all of the parameters cannot be stored in a memory or the like. In this case, the parameters are to be read out from another storage device, and when the number of times of reading out the parameters increases, processing speed decreases. In addition, in case of intending to improve the processing speed, a memory band has to be increased to have a large width, and this fact causing increase of the power consumption.

On the other hand, if the parameters are dynamically generated, such a problem does not occur. In this case, it is concerned about the deterioration of accuracy. However, it is sufficient if the partial feature quantity such as the partial feature quantity having the large number of dimensions capable of keeping the necessary accuracy is selected by the machine learning method. In this manner, quantity of parameters for the dimension compression to be previously held can be suppressed by switching the obtaining methods of parameters for the dimension compression for each partial feature quantity. As described above, the deterioration of recognition accuracy can be suppressed, the quantity of the parameters for the dimension compression can be suppressed, and the width of a memory band necessary for reading out the dimension compression parameters and the power consumption can be suppressed.

Second Embodiment

Hereinafter, the second embodiment of the present invention will be described. The present embodiment is different from the first embodiment in a point that the dimension compression is performed after connecting plural partial feature quantities as compared with the first embodiment. Hereinafter, it will be specifically described. As to the entire constitution of an object discriminating apparatus and the processes to be performed according to the present embodiment, since these are basically similar to those in FIGS. 1 and 2 respectively, the description thereof will be omitted. In the present embodiment, a part of the constitution of each of the partial feature dimension compressing units 402 and 902 illustrated in FIGS. 4 and 9 is different from that in the first embodiment. Further, a part of the process for discriminating the input object is different from that in the first embodiment. Hereinafter, points different from those in the first embodiment will be mainly described.

<Partial Feature Dimension Compressing Unit 402>

Figure 12:
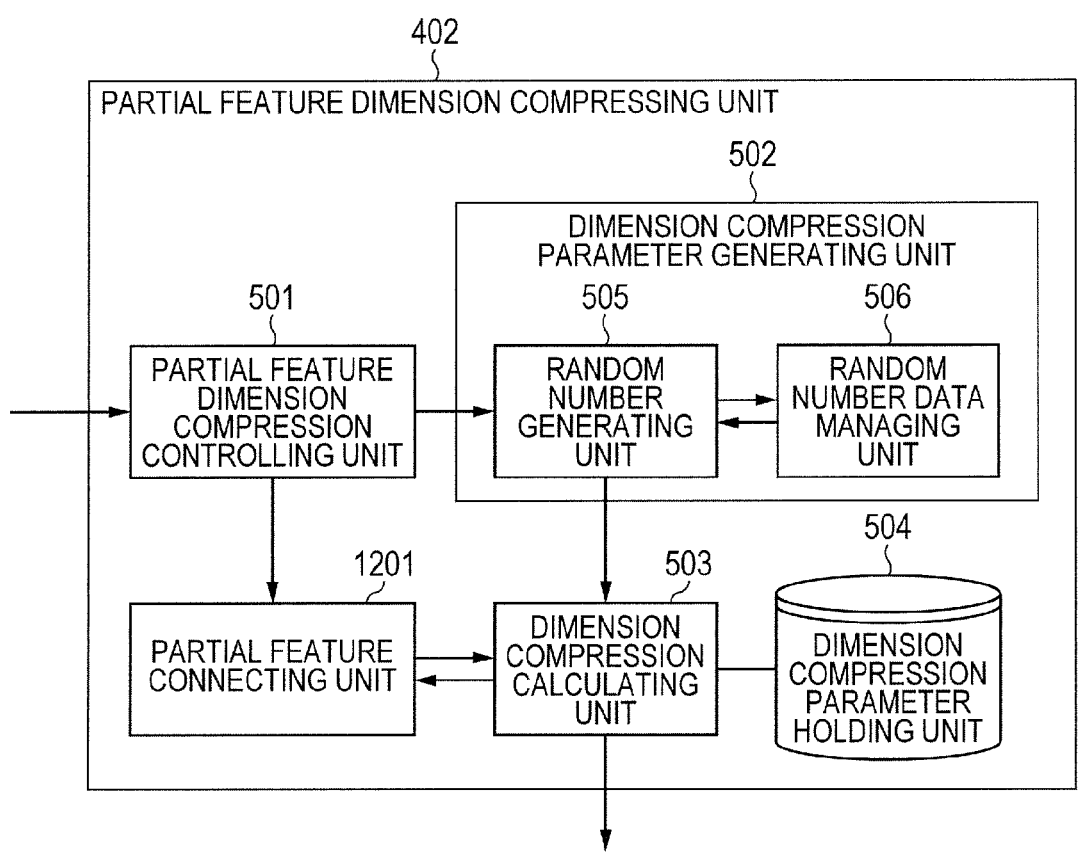
FIG. 12 is a block diagram illustrating a detailed constitutional example of the partial feature dimension compressing unit according to the second embodiment.

FIG. 12 is a block diagram illustrating a detailed constitutional example of the partial feature dimension compressing unit 402 in the present embodiment. It is premised that the partial feature dimension compressing unit 902 included in the input object discrimination data generating unit 701 also has the similar constitution. As illustrated in FIG. 12, the partial feature dimension compressing unit 402 has the partial feature dimension compression controlling unit 501, the dimension compression parameter generating unit 502, the dimension compression calculating unit 503, the dimension compression parameter holding unit 504 and a partial feature connecting unit 1201. The present embodiment is different from the first embodiment in a point that the partial feature connecting unit 1201 is added. As to the constitution which is the same as that illustrated in FIG. 5, since a role thereof is similar, the description will be omitted.

The partial feature connecting unit 1201 performs a connecting process of the partial feature quantity vectors. For example, in case of existing two partial feature quantity vectors of which the number of dimensions is respectively 100 dimensions, these two vectors are simply connected to output as the partial feature quantity vectors of which the number of dimensions is 200 dimensions. The details of the process to be performed in the partial feature connecting unit 1201 will be described later.

Figure 13:
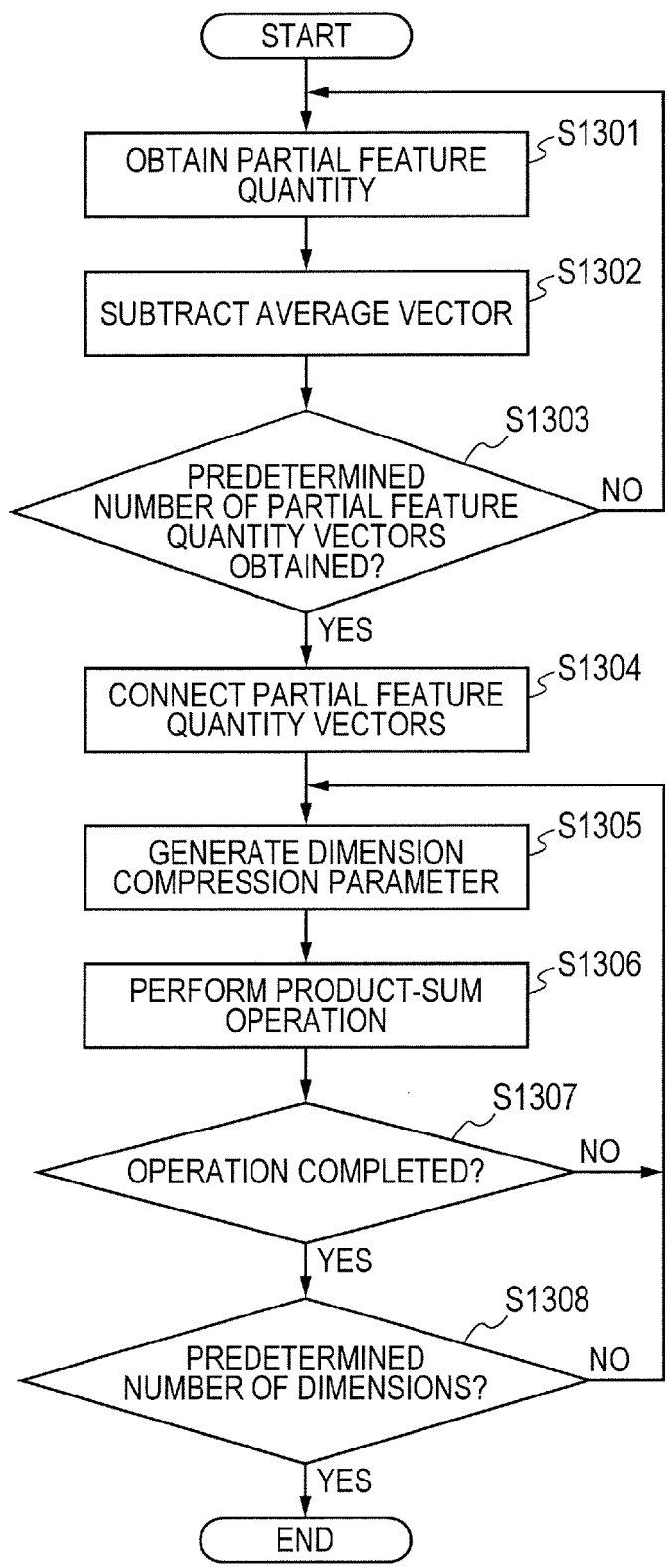
FIG. 13 is a flow chart indicating an example of a processing procedure of compressing the number of dimensions of the partial feature quantity when generating dictionary data, in the second embodiment.

FIG. 13 is a flow chart indicating an example of a processing procedure of dimensionally compressing the partial feature quantity when generating dictionary data of the registration object by the partial feature dimension compressing unit 402. First, in S1301, the partial feature dimension compression controlling unit 501 obtains the partial feature quantity vectors. Subsequently, in S1302, the dimension compression calculating unit 503 obtains average vectors which correspond to the obtained partial feature quantity vectors from the dimension compression parameter holding unit 504 and subtracts the average vectors from the partial feature quantity vectors.

Subsequently, in S1303, the dimension compression calculating unit 503 decides whether or not the number of the partial feature quantity vectors, from which the average vectors are subtracted, reach a predetermined number. As a result of this decision, in case of not reaching the predetermined number, a flow returns to S1301. On the other hand, in case of reaching the predetermined number, the partial feature connecting unit 1201 connects the obtained plural partial feature quantity vectors with each other in S1304.

Here, as to a connecting method, it may be a simple connection as described above. The combination of the partial feature quantity vectors to be connected and the connecting order when connecting them are previously determined. For example, the connecting order is determined in accordance with attributes of the partial feature quantities. More specifically, a certain position in the object is treated as a standard position, and a method of connecting the vectors which are closer to that position or a method of connecting the vectors clockwise around the standard position may be previously determined, or may be previously determined by a machine learning method. In this case, the order of connecting the partial feature quantity vectors does not directly influence the accuracy. However, consistency is to be kept between the partial feature quantity of the registration object after completing the connection and the partial feature quantity of the input object after completing the connection such that the accuracy is not deteriorated.

As to a matter how many the partial feature quantity vectors are to be connected, there is a following standard. That is, it is to increase the dimension up to such a level capable of exerting the sufficient discrimination accuracy even if the post-parameter for the dimension compression is dynamically generated. In the first embodiment, even if the dimension compression (random projection) is performed by using the dynamically generated parameters (typically, random numbers), a case capable of holding accuracy is such a case, where the number of dimensions of the partial feature quantity vectors is a large number. In the present embodiment, even if the number of dimensions of the each partial feature quantity is a small number at such a level incapable of maintaining the accuracy by the random projection, plural partial feature quantities are connected to treat the connected one as the one partial feature quantity vector, and the number of dimensions is increased such that the discrimination accuracy can be maintained by the random projection.

Next, in S1305, the dimension compression parameter generating unit 502 generates the parameters for dimensionally compressing the connected partial feature quantity vectors. Here, the random projection is applied to all of the connected partial feature quantity vectors different from a case of the first embodiment. The processes from S1306 to S1308 in the following are respectively similar to the processes from S609 to S611 in FIG. 6.

Next, a process of dimensionally compressing the partial feature quantity when discriminating the input object will be described. When the dictionary data of the registration object is generated, the random projection is performed one time to the one connected partial feature quantity vector and the one partial feature quantity vector is output. For this case, when the input object is discriminated, the plural partial feature quantity vectors are output to the one connected partial feature quantity vector after performing the dimension compression, and this point is different from the above case.

Figure 14:
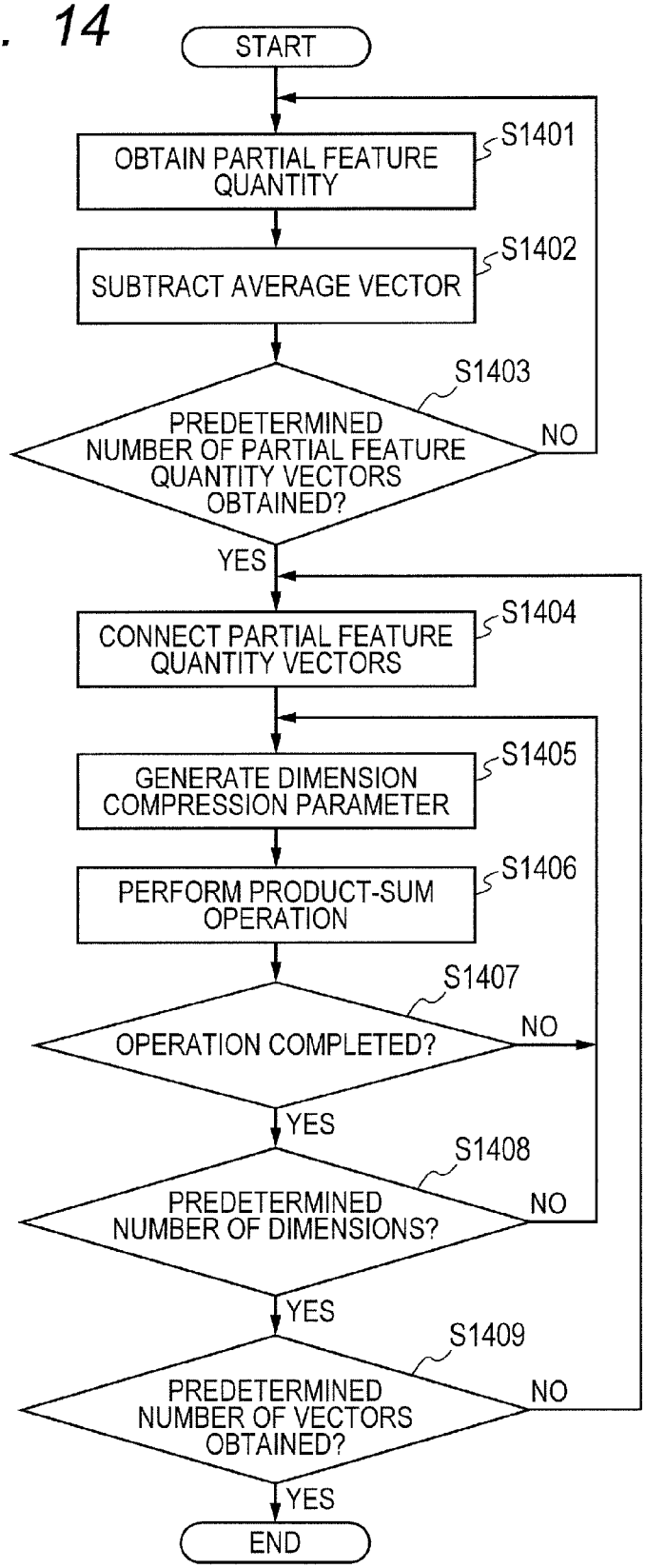
FIG. 14 is a flow chart indicating an example of a processing procedure of compressing the number of dimensions of the partial feature quantity when generating discrimination data, in the second embodiment.

FIG. 14 is a flow chart indicating an example of a processing procedure of dimensionally compressing the partial feature quantity when discriminating the input object in the present embodiment. In FIG. 14, since the processes from S1401 to S1403 are respectively similar to the processes from S1301 to S1303 in FIG. 13, the description thereof will be omitted. A predetermined number of the partial feature quantity vectors are connected in S1404. At this time, the connecting order is determined by plural patterns different from a case of S1304 in FIG. 13. That is, in the decision to be performed in S1409, the connecting order is changed until the predetermined number of the partial feature quantity vectors after performing the dimension compression can be obtained, and plural connected partial feature quantity vectors are generated.

For example, when the partial feature quantity vectors targeted to be connected are three vectors A, B and C, the connecting processes are performed until reaching the predetermined number while changing the connecting order like such order of ABC, BCA, CAB and the like. Since the processes from S1405 to S1408 are respectively similar to the processes from S1305 to S1308 in FIG. 13, the description thereof will be omitted.

Next, a calculating process for discriminating the input object will be described. In the first embodiment, the discrimination data of the input object corresponds to the dictionary data of the registration object with a state of on-to-one, but in the present embodiment, plural discrimination data exist for the one dictionary data of the registration object.

Figure 15:
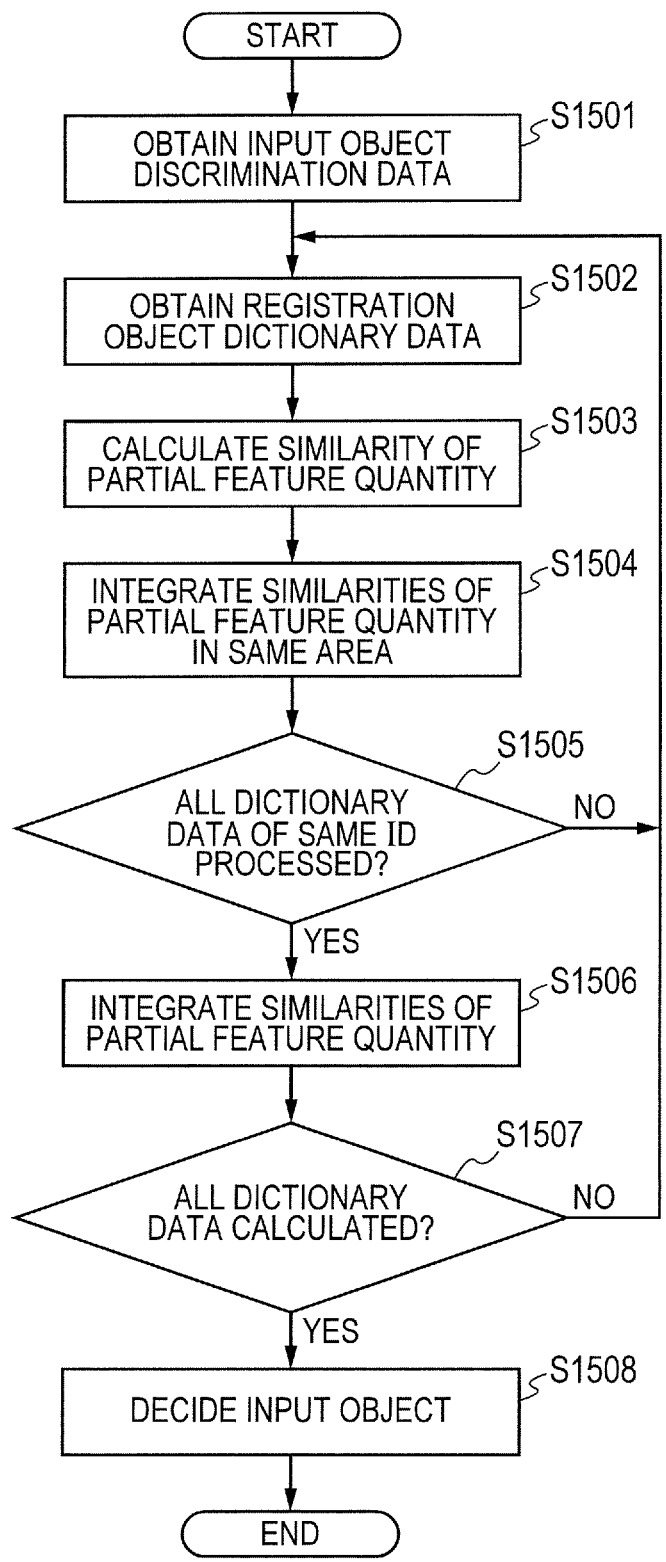
FIG. 15 is a flow chart indicating an example of a detailed processing procedure of discriminating an input object, in the second embodiment.

FIG. 15 is a flow chart indicating an example of a procedure of the calculating process for discriminating the input object. First, in S1501, the input object discrimination data obtaining unit 1001 obtains the discrimination data of the input object. As described above, in the present embodiment, the discrimination data of the input object is different from a case of the first embodiment in the following point. That is, plural partial feature quantity vectors of the input object (hereinafter called as input feature quantity vectors), which correspond to the one partial feature quantity vector (hereinafter called as registration feature quantity vector) in the dictionary data of the registration object, exist.

Subsequently, in S1502, the registration object dictionary data obtaining unit 1002 obtains the dictionary data of the registration object. Next, in S1503, the partial feature similarity calculating unit 1003 calculates the similarity of the corresponding partial feature quantity from the discrimination data of the input object and the dictionary data of the registration object which were obtained. Although a calculating method of the similarity is basically similar to that of the first embodiment, since the plural input feature quantity vectors, which correspond to the registration feature quantity vector, exist, the similarities are calculated by the number of the input feature quantity vectors.

Next, in S1504, the partial feature similarity calculating unit 1003 integrates the plural similarities calculated for the one registration feature quantity vector into the one similarity. As an integrating method, for example, the maximum value is to be selected from the plural similarities.

The input feature quantity vector is such a vector, to which the dimension compression was performed after connecting the partial feature quantity vectors by switching the order of them. Therefore, in a case that the partial feature quantity vector group before connecting the vectors was obtained from the vicinity spatially on the input object, if the maximum value of the similarities is selected, there is an effect of absorbing displacement between the registration feature quantity vector and the input feature quantity vector. Generally, when inner products are calculated between the partial feature quantity vectors, if even one portion that is easy to coincide with an inner product value in these inner products exists, the inner product value becomes larger than that in the inner products between the unconcerned partial feature quantity vectors. That is, the similarities are calculated by changing the connecting order, and if the maximum value of them is adopted, the most coincident portion is to be searched while performing the spatial scanning, and the displacement between the registration feature quantity vector and the input feature quantity vector can be absorbed. Since the processes from S1505 to S1508 are respectively similar to the processes from S1104 to S1107 in FIG. 11, the description thereof will be omitted.

In the present embodiment, a random project is enabled to be performed even to the partial feature quantity vector, of which the dimension is comparatively small, characterized in that the accuracy cannot be maintained by the random project, and a read-out cost of the parameters for the dimension compression can be minimized. The spatial displacement between the registration feature quantity vector and the input feature quantity vector can be absorbed by performing a connecting process of the partial feature quantity vectors which were obtained from the spatially close positions while changing the connecting order and generating plural partial feature quantity vectors.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-062663, filed Mar. 25, 2014, which is hereby incorporated by reference herein in its entirety.

What is claimed is:

1. An image recognizing apparatus comprising:
a memory for storing a program;
a processor for executing the program stored in the memory to function as:
an extracting unit configured to extract a partial feature quantity from an object in an input image;
a determination unit configured to determine, based on an attribute of the partial feature quantity extracted by the extracting unit, whether or not a parameter for dimension reduction is to be dynamically generated;
a generation unit configured to generate a dynamic parameter for dimension reduction if the determination unit determines that the parameter is to be dynamically generated;
a read out unit configured to read out a preset parameter for dimension reduction stored in a parameter storing unit if the determination unit does not determine that the parameter is to be dynamically generated;
a reduction unit configured to reduce a dimension of the partial feature quantity using the dynamic parameter for dimension reduction generated by the generation unit or the preset parameter for dimension reduction read out by the read out unit;
a feature quantity storing unit configured to store the partial feature quantity of an object in a registration image of which a dimension has been reduced; and
a calculating unit configured to calculate similarity between the object in the input image and the object in the registration image, using the partial feature quantity of the object in the input image of which the dimension has been reduced by the compressing unit and the partial feature quantity of the object in the registration image stored in the storing unit.

2. The image recognizing apparatus according to claim 1, wherein, if the determination unit determines that the parameter is to be dynamically generated, the generation unit generates the parameter by generating a random number sequence.

3. The image recognizing apparatus according to claim 1, wherein, if the determination unit determines that the parameter is to be dynamically generated, the generation unit generates the parameter by generating a random number so as to reduce a random number period.

4. The image recognizing apparatus according to claim 1, further comprising a connecting unit configured to connect the plurality of partial feature quantities,
wherein the connecting unit connects the partial feature quantities as a vector until the number of dimensions of the connected partial feature quantities reaches a predetermined number of dimensions, so as to reduce the dimension of the connected partial feature quantities.

5. The image recognizing apparatus according to claim 4, wherein, in case of connecting the plurality of partial feature quantities, the connecting unit generates the plurality of connected partial feature quantities by rearranging order.

6. The image recognizing apparatus according to claim 1, wherein the object includes a person's face.

7. An image recognizing method comprising:
using at least one processor to perform the steps of:
extracting a partial feature quantity from an object in an input image;
determining, based on an attribute of the partial feature quantity extracted by the extracting step, whether or not a parameter for dimension reduction is to be dynamically generated;
generating a dynamic parameter for dimension reduction if the determination step determines that the parameter is to be dynamically generated;
reading out a preset parameter for dimension reduction stored in a parameter storing unit if the determination step does not determine that the parameter is to be dynamically generated;
reducing a dimension of the extracted partial feature quantity using the generated dynamic parameter for dimension reduction or the read out preset parameter for dimension reduction;
storing the partial feature quantity of an object in a registration image of which a dimension has been reduced; and
calculating similarity between the object in the input image and the object in the registration image, using the partial feature quantity of the object in the input image of which the dimension has been reduced and the partial feature quantity of the object in the stored registration image.

8. A non-transitory computer-readable storing medium which stores a program to cause a computer to perform the steps of:
extracting a partial feature quantity from an object in an input image;

determining, based on an attribute of the partial feature quantity extracted by the extracting step, whether or not a parameter for dimension reduction is to be dynamically generated;

generating a dynamic parameter for dimension reduction if the determination step determines that the parameter is to be dynamically generated;

reading out a preset parameter for dimension reduction stored in a parameter storing unit if the determination step does not determine that the parameter is to be dynamically generated;

reducing a dimension of the extracted partial feature quantity using the generated dynamic parameter for dimension reduction or the read out preset parameter for dimension reduction;

storing the partial feature quantity of an object in a registration image of which a dimension has been reduced; and calculating similarity between the object in the input image and the object in the registration image, using the partial feature quantity of the object in the input image of which the dimension has been reduced and the partial feature quantity of the object in the stored registration image.

* * * * *